US012392869B1

(12) United States Patent
Hu et al.

(10) Patent No.: US 12,392,869 B1
(45) Date of Patent: Aug. 19, 2025

(54) AUTOMATIC HAIL IDENTIFICATION METHOD BASED ON RADAR IMAGE SPATIAL MAPPING

(71) Applicant: Chengdu University of Information Technology, Chengdu (CN)

(72) Inventors: Wendong Hu, Chengdu (CN); Fei Luo, Chengdu (CN); Zhiliang Shu, Chengdu (CN); Jianhong Gan, Chengdu (CN); Zhuolin Chang, Chengdu (CN); Yang Cui, Chengdu (CN); Yukun Yang, Chengdu (CN); Tiangui Xiao, Chengdu (CN); Yan Chen, Chengdu (CN); Juzhang Ren, Chengdu (CN); Yu Peng, Chengdu (CN); Jiajun Zhou, Chengdu (CN); Wenjie Zhou, Chengdu (CN); Yanqiong Hao, Chengdu (CN)

(73) Assignee: Chengdu University of Information Technology, Chengdu (CN)

( * ) Notice: Subject to any disclaimer, the term of this patent is extended or adjusted under 35 U.S.C. 154(b) by 0 days.

(21) Appl. No.: 19/207,624

(22) Filed: May 14, 2025

(30) Foreign Application Priority Data

May 15, 2024 (CN) .......................... 202410598635.X

(51) Int. Cl.
*G01S 7/41* (2006.01)
*G01S 13/89* (2006.01)
*G01S 13/95* (2006.01)

(52) U.S. Cl.
CPC ............... *G01S 7/411* (2013.01); *G01S 7/414* (2013.01); *G01S 7/418* (2013.01); *G01S 13/89* (2013.01); *G01S 13/95* (2013.01)

(58) Field of Classification Search
None
See application file for complete search history.

(56) References Cited

U.S. PATENT DOCUMENTS 7,307,576 B1 * 12/2007 Koenigs ................. G01S 13/953
342/26 B
9,322,914 B1 * 4/2016 Finley ..................... G01S 13/95
(Continued)

FOREIGN PATENT DOCUMENTS

CN     108680920 A    10/2018
CN     110161506 B     8/2019
(Continued)

OTHER PUBLICATIONS

L. Lemon, "The Radar 'Three-Body Scatter Spike': An Operational Large-Hail Signature"; published in the magazine, "Weather and Forecasting"; (ISSN: 0882-8156; eISSN: 1520-0434); vol. 13, issue 2; Jun. 1998; pp. 327-340; American Meteorological Society; Boston, MA, USA. (Year: 1998).*

(Continued)

*Primary Examiner* — Bernarr E Gregory
(74) *Attorney, Agent, or Firm* — Birchwood IP

(57) ABSTRACT

Provided is an automatic hail identification method based on radar image spatial mapping, including: obtaining a base reflectivity radar image; grading radar echoes using intensity values represented by different colors, and detecting radar center coordinates; performing spatial mapping, and establishing a dictionary for radar echo intensity in a new radar image space; after expanding the dictionary, transforming V-shaped notch and TBSS characteristics behind an original radar strong echo area into a standard rectangle and a triangle behind a strong echo in the new radar image space; determining whether there is a V-shaped notch and TBSS according to whether there is a standard rectangle or a triangle behind the strong echo; and if so, marking in the original radar image and calculating a position where hail occurs. A rapid and accurate method is provided for auto- (Continued)

mation of hail monitoring and early warning and elimination of continuous high-intensity analysis pressure of forecasters.

7 Claims, 8 Drawing Sheets

(56) References Cited

U.S. PATENT DOCUMENTS

| | | | | |
|---|---|---|---|---|
| 2011/0148694 | A1* | 6/2011 | Bunch | G01S 13/953 342/26 B |
| 2017/0276785 | A1* | 9/2017 | Sneed | G01S 13/95 |
| 2018/0149745 | A1* | 5/2018 | Christianson | G01S 13/953 |
| 2019/0064347 | A1* | 2/2019 | Jones | G01S 13/95 |

FOREIGN PATENT DOCUMENTS

| | | | | |
|---|---|---|---|---|
| CN | 113095442 B | * | 9/2021 | G06F 18/24 |
| FR | 2658617 A1 | * | 8/1991 | G01S 13/951 |
| FR | 2820215 A1 | * | 8/2002 | G01S 13/951 |

OTHER PUBLICATIONS

P. Kurimski, "Radar Observations Of A Rare 'Triple' Three-Body Scatter Spike"; published by the National Weather Service office in White Lake, Michigan, USA; May 17, 2012. (Year: 2012).*

Li Shuo; Wang Xue Xu Wenxia; Li Guodong Based on SVM and radar echo inversion Research on hail cloud model recognition with rate study carefully, Journal of Dongguan University of Technology, No. 03, Jun. 15, 2016 (Jun. 15, 2016), Full Text.

Liao Yufang; Pan Zhixiang; Guo Qing; Severe convective weather forecast and warning method based on single Doppler weather radar products, Meteorological Science, No. 05, Oct. 30, 2006 (Oct. 30, 2006), Full Text.

Pan Yue, a hailstone recognition model based on significant features, Basic science edition of Chinas excellent masters thesis full text database, Aug. 15, 2014 (Aug. 15, 2014), Full Text.

Ding Qianwen, Research on hail detection method based on image feature analysis, Information Technology section of Chinas excellent Masters Thesis Full-text Database, Jan. 15, 2023 (Jan. 15, 2023), Full Text.

Lu Zhiying et al., Hail and rainstorm recognition based on radar reflectivity image features, Journal of Tianjin University (Natural Science and Engineering Technology version), Sep. 23, 2014 (Sep. 23, 2014), Full Text.

Wang Ping et al., weather radar reflectivity The three-body scattering is self contained in the factor image Motion recognition, Journal of Tianjin University (Natural Science and Engineering Technology version), Sep. 11, 2013 (Sep. 11, 2013), Full Text.

WangXue etc., Recognition of the Hail Image Based on Distance Diseriminant, 2015 International Conference on Intelligent Transportation, Big Data and Smart City, Jan. 21, 2016 (Jan. 21, 2016), Full Text.

Zhiying Lu etc., Hailstone Detection Based on Imagc Mining, 2008 Fifth International Conference on Fuzzy Systems And Knowledge Discovery, Nov. 5, 2008 (Nov. 5, 2008), Full Text.

* cited by examiner

AUTOMATIC HAIL IDENTIFICATION METHOD BASED ON RADAR IMAGE SPATIAL MAPPING

CROSS-REFERENCE TO RELATED APPLICATIONS

This application claims priority to Chinese Patent Application No. 202410598635.X, filed on May 15, 2024, which is hereby incorporated by reference in its entirety.

TECHNICAL FIELD

The present application relates to the technical field of meteorological disaster early warning in natural disaster defense, and in particular, to an automatic hail identification method based on radar image spatial mapping.

BACKGROUND

In meteorology, hail refers to a disastrous weather phenomenon caused by severe thunderstorms. Hail is a type of solid precipitation particle that falls very quickly and contains high energy. Therefore, hail may cause extremely serious damage to humans, animals, agriculture, property, and the like, and requires high attention and timely prevention. Discovering hail and issuing timely warnings is one of the main tasks of the meteorological department in the summer half of the year. Hail is also a statutory meteorological disaster for which a warning signal must be issued.

Currently, the identification of hail mainly relies on meteorological radar technology. In China, radars in the southern regions operate normally during winter, while those in the northern regions perform scheduled daytime monitoring daily. In summer, all operational radars across China maintain persistent monitoring of atmospheric phenomena without interruption once initialized. The radar performs three-dimensional "CT scans" on the atmosphere throughout China at all times, which detects abnormal atmospheric activities, including hail processes, at the speed of light of electromagnetic waves, thereby establishing the core position of radar technology in hail monitoring and early warning work. The radar transmits electromagnetic waves and receives electromagnetic waves reflected by objects (this reflection process is essentially backscattering, which is referred to as reflection below for convenience). The nature, direction and distance of the target are determined by the intensity and time of the received echo, and the detection echo of the radar is formed into a reflectivity image. Experienced professionals may analyze and identify hail using meteorological radar images by observing and analyzing the characteristics of the reflectivity image.

The new generation of meteorological radars commonly used by meteorological departments may provide dozens to hundreds of products such as basic reflectivity, radial velocity and spectral width. Basic reflectivity is the most core business product, which reflects the reflection of electromagnetic waves emitted by the radar by various particles in the atmosphere.

A V-shaped notch refers to a reflective structure formed in a radar echo image due to the obstruction of electromagnetic waves by the shape and physical characteristics of hail particles.

When a radar at a certain place performs a detection scan, as shown in FIG. 1, the effective range of detection of electromagnetic wave emitted by the radar antenna at point O in FIG. 1 forms a circle. The various particles in the atmosphere within this circle have different backscattering (reflection for short for ease of understanding) capabilities, so that particle echoes of different intensities in different positions may be seen in a horizontal scanning echo image of the radar (a radar image for short). Generally, after ordinary atmospheric particles reflect part of the electromagnetic waves, although the reflection intensity of particles at a far place is attenuated, the particles may be corrected by mathematical algorithms based on physical mechanisms, so that the atmospheric conditions behind a certain particle may still be displayed on the radar image.

However, if the reflection capability of an object which is met by the electromagnetic wave detected by the radar at a near place is extremely strong, the electromagnetic wave is blocked and cannot detect the atmosphere behind the object. For example, a tall building or a mountain peak (five-star position in FIG. 1—strong echo caused by strong reflection of hail) blocks the electromagnetic wave emitted by the radar from the point O (two straight lines emitted by the origin radar antenna in FIG. 1), so that no echo signal exists behind the object (an area surrounded by the two straight lines and five stars in FIG. 1). In this case, it may be found that if there is precipitation, precipitation echoes of varying intensities may occur throughout the map, but there is no echo in the area where the five-star strong reflector is far away from the radar, forming a notch on the radar image as shown in FIG. 1. The notch points to the origin of the electromagnetic wave, i.e., the radar station, and is in the shape of the letter V, which is the V-shaped notch area caused by the hail obstruction in the image.

When radars are deployed, places with no obstruction or little obstruction are chosen, and tall buildings or mountains are fixed positions that are easy to identify. However, in severe weather, especially during strong thunderstorms, V-shaped notches occur in other positions on the radar image, which must be caused by hail, because hail is relatively large particles with strong reflective ability in the atmosphere.

Meteorological radars are designed and manufactured to detect precipitation particles in the atmosphere, and the target objects are generally very small. Hail is much greater than water droplets, and therefore has a particularly strong ability to reflect electromagnetic waves. The electromagnetic waves detected by radar produce strong reflection when encountering hail, and the C-band electromagnetic waves are severely attenuated. The rainfall particles behind the hail cannot produce effective echoes and are completely shielded, which occur as a V-shaped notch on the radar image. Therefore, hail may be detected by analyzing the characteristics of the V-shaped notch.

If a hail C has a large size and a strong reflective ability, the electromagnetic waves emitted by the radar are reflected in various directions such as the ground after encountering the hail C, and then reflected back to the hail from the ground; and finally part of the electromagnetic waves are reflected back to the radar antenna, thus forming a false echo. This false echo reaches the radar antenna later after multiple reflections. The radar determines the distance based on the arrival time of the reflected electromagnetic waves. The farther away, the later the return time, so that the late signals passing through the three-body relay of hail-ground-hail on a radar image are mistaken as objects farther away. Therefore, behind large hail, the false signal with very low echo intensity occurs. Only very large hail can reflect electromagnetic waves multiple times. This phenomenon is called three body scatter signature, or TBSS (hereinafter referred to as three-body scatter spike).

TBSS typically occurs as a distinct spike or band-shaped echo in meteorological radar image, indicating the presence of larger hail particles.

Both V-shaped notch and TBSS are the clearest methods for determining the physical mechanism of hail on radar echo images, and are the most practical and reliable methods in monitoring and forecasting operations. The V-shaped notch corresponds to relatively small-sized hail, and TBSS corresponds to large-sized hail. The V-shaped notch occurs as a roughly triangular shape with an echo intensity of 0, the inward angle of which points accurately towards the radar, and at the front of which is the position where hail occurs, there is a strong echo of hail. TBSS occurs as a relatively weak echo on the extension line of the strong echo caused by radar and large hail. If any one of the V-shaped notch and TBSS occurs, the hail may be determined. Theoretically, if the electromagnetic waves detected by the radar are dense enough to achieve a high resolution, both the V-shaped notch and the TBSS should occur as a fan shape. However, the current radar scans horizontally at intervals of 1 degree, and the resolution is too low, so that what actually occurs on the radar echo image is a triangle rather than a sector. For theoretical analysis, the fan shape in an ideal state is discussed below. The principles of V-shaped notch and TBSS for identifying hail are widely used in work, and meteorological departments generally rely on analyzing the above characteristics to determine the hail detected on radar images. However, currently, the use of these characteristics by various business departments is limited to manual subjective determination, and automatic identification of business has not yet been achieved.

With the further in-depth study of hail, some methods for hail forecasting have also emerged. At present, in the field of meteorology, in addition to V-shaped notch and TBSS, there are mainly three existing technical solutions for artificially identifying hail:

Method based on reflectivity factor combined with other parameters: The possibility and size of hail are determined by the intensity and vertical distribution of radar echoes. For example, if the 50 dBZ of echo extends to a height above the −20° C. isotherm, and the 0° C. isotherm is about 3 to 4 km above the ground, a severe hail warning may be considered. In addition, derivative products of the reflectivity factor, such as the vertical integrated liquid (VIL) water content and VIL density, and hail index (HI), may also be used to determine the presence and size of hail.

Radial velocity-based method: The motion and distribution of hail are determined using the velocity and spectral width of the radar echo. For example, the growth and fall of hail are determined by observing the characteristics of updrafts using Doppler radar, such as mesocyclones and storm-top divergence. In addition, the direction and velocity of hail may also be determined using derivatives of radial velocity, such as the storm relative motion (SRM) velocity and the storm tracking algorithm (STA).

Polarization parameter-based method: The shape and phase of the hail are determined using the polarization characteristics of dual-polarization radar observations. For example, the sphericity, liquid water content, and particle density of hail may be determined using polarization parameters such as differential reflectivity (ZDR), differential phase shift (KDP), and correlation coefficient (CC). In addition, the presence and probability of hail may also be determined using derivative products of polarization parameters, such as the hail detection algorithm (HDA) and the hail probability algorithm (HPA).

The current method based on reflectivity factors must analyze a plurality of derivative products at the same time, and the parameters need to be adjusted according to different regions and seasons. For example, the altitude at which −20° C. and 0° C. occur changes not only every day but also every hour, and it is extremely inconvenient to measure the temperature in the vertical direction, which causes underreporting or false alarms. The application is not convenient enough and is subject to many limitations.

The radial velocity-based method requires a high-resolution Doppler radar and has high requirements on the quality and direction of the radar beam. In addition, the characteristics of radial velocity may be affected by the complexity and heterogeneity of the wind field, making it difficult to determine the velocity variation and distribution.

The polarization parameter-based method requires a dual-polarization radar and has high requirements for radar calibration and maintenance. In addition, the characteristics of polarization parameters may be affected by factors such as the shape, phase, direction, and density of hail, making it difficult to determine the changes and distribution of polarization parameters.

However, in addition to the defects in the existing technology, the biggest problem is that hail identification still relies on manual methods in business work.

During the season when hail is prone to occur, each meteorological radar continuously performs multi-level three-dimensional scanning of the atmosphere, so that forecasters are required to analyze relevant radar products at any time. Even in the relatively arid northwest region, a radar may generate 73 detection maps every 6 minutes. Obviously, manually analyzing this data is a huge task, and it is practically impossible to complete the analysis and only discard part of the data. Manual identification of hail is very inefficient, requires high professional skills, and is very stressful. It is very easy to cause misjudgments and omissions due to work fatigue.

A Doppler meteorological radar scans a large amount of data at a time and works around the clock for several months without stopping. However, due to the extremely complex terrain, for a meteorological station, the entire forecast and warning area cannot be guaranteed to be within the optimal detection range of a certain radar. Therefore, in many cases, it is necessary to monitor the local detection results of a plurality of radars at the same time. Because of the constant pressure on the transmission system caused by the huge amount of data and the relevant regulations on the confidentiality of original data, the vast majority (thousands) of stations cannot obtain radar detection data and can only receive radar images. Therefore, the difficulty faced by these thousands of meteorological stations is that dozens or hundreds of image products from a plurality of radars are received within 6 minutes, but the interpretation and identification capabilities are very limited. It is a very serious challenge to effectively, correctly and timely identify serious disasters such as hail.

SUMMARY

Aiming at the defects in the prior art, the present disclosure provides an automatic hail identification method based on radar image spatial mapping, which is a quick and accurate method for the automation of monitoring and early warning of hail and eliminating the continuous high-intensity analysis pressure of forecasters.

To achieve the above objective, the present disclosure adopts the following technical solution. An automatic hail identification method based on radar image spatial mapping includes the following steps:

S1: obtaining a base reflectivity radar image, where the base reflectivity radar image includes radar information parameters and a radar echo image;

S2: identifying text information, digital parameters and color scales from the radar information parameters, grading radar echoes using intensity values represented by different colors, and detecting radar center coordinates from the radar echo image;

S3: performing spatial mapping on radar echo information through a planar projection algorithm by using the radar center coordinates and the identified text information and digital parameters, and establishing a dictionary for radar echo intensity in a new radar image space;

S4: after expanding the dictionary in a rectangular coordinate system of a screen, transforming V-shaped notch and TBSS characteristics behind an original radar strong echo area into a standard rectangle and a triangle behind a strong echo in the new radar image space;

S5: establishing an identification for the standard rectangle and the triangle behind the strong echo in the new radar image space, filtering out noise interference, and analyzing the standard rectangle and the triangle outside of a high-intensity echo by graphic fitting, where if the standard rectangle behind the strong echo in the new radar image space is successfully fitted, there is a V-shaped notch in the original radar image, and there is small hail; if the triangle behind the strong echo in the new radar image space is successfully fitted, there is TBSS in the original radar image, and there is large hail; otherwise, there is no hail; and S6: marking the V-shaped notch or the TBSS if any in the original radar image, calculating a position where hail occurs using the identified text information and digital parameters, outputting an identification result as large hail or small hail, and the position where hail occurs, otherwise, outputting no hail.

Further, the S2 includes the following steps:

S201: identifying text information and digital parameters in a text description from a description of the base reflectivity radar image and a radar information parameter area;

S202: identifying parameters and color scales from the description of the base reflectivity radar image and a radar information parameter area, and grading radar echoes by intensity values represented by different colors; and S203: detecting radar center coordinates from the radar echo image according to a grading result, where the detection is performed at each angle in sequence from the radar center from inside to outside in a clockwise direction from due north until the detection of an entire radar echo image is completed.

Further, the S3 includes the following steps:

S301: according to the radar center coordinates and the identified text information and digital parameters, storing radar echo intensity levels of points in an original radar echo image into a dictionary after radar echo information of points is subjected to spatial mapping according to a planar projection algorithm, where the points are all points in the original radar echo image;

S302: determining whether an angle of a certain point from the radar center exists in a key of the dictionary, if so, storing coordinates and a radar echo intensity level of the point into the dictionary, and proceeding to S303, otherwise, establishing a key value pair in the dictionary to store the coordinates and the radar echo intensity level of the point, and proceeding to S303; where the point is a currently processed point in the original radar echo image;

S303: establishing a dictionary for radar echo intensity in a new radar image space after the spatial mapping is completed.

Further, the spatial mapping is specifically as follows:

in the original radar echo image, a position of each point is represented by screen coordinates (xy) and is subjected to spatial mapping by using the following formula:

$$\theta = tg^{-1} \frac{x - x_0}{y - y_0};$$

$$r = \sqrt{(x - x_0)^2 + (y - y_0)^2};$$

where ($\theta$,r) represents polar coordinates of each point of the radar echo, $\theta$ represents an angle, r represents a distance to a center of a circle. $x_0$ represents an abscissa of a radar station, $y_0$ represents an ordinate of a radar station, $x_0$ and $y_0$ together represent a position of an origin in the original radar echo image, tg represents a tangent function in a trigonometric function, $tg^{-1}$ represents an inverse function of the tangent function, and (xy) represents screen coordinates.

Further, the S5 includes the following steps:

S501: filtering out noise interference of the new radar image;

S502: setting a radar echo intensity level greater than or equal to 12 as a hail target;

S503: analyzing a position behind the hail target by graphic fitting on outside of a high-intensity echo in a new radar image space after spatial projection according to the conditions set in the S502; and S504: determining whether there is a V-shaped notch and TBSS in the radar strong echo area based on the two-dimensional array D according to a result of the graphic fitting analysis and whether there is a standard rectangle or a triangle behind the strong echo, where if the standard rectangle behind the strong echo in the new radar image space is successfully fitted, there is a V-shaped notch in the original radar echo image, and there is small hail; if the triangle in the new radar image space is successfully fitted, there is TBSS behind the strong echo in the original radar echo image, and there is large hail; otherwise, there is no hail, and the process ends.

Further, the determining whether there is a V-shaped notch in the radar strong echo area is specifically as follows:

A1: creating an empty list List1 for storing V-shaped notch position information;

A2: taking the transformed dictionary as a matrix M, where $M_{i,j}$ represents an element in an $i^{th}$ row and $j^{th}$ column;

$$\text{max\_positions}(j) = \max_{i}(M_{i,j});$$

where max represents a maximum value, max_positions(j) represents a position where the maximum value occurs, and $$\max_i(M_{i,j})$$

represents a result of taking maximum values of all elements in the $i^{th}$ row;

A3: if there is a same maximum value in the same column, determining a position where the maximum value occurs last: last_max_positions(j)=max_positions(j)$_{lastoccurrence}$; where last_max_positions(j) represents a position where the maximum value occurs last, and max_positions(j)$_{lastoccurrence}$ represents finding a position where a last maximum value occurs in the same column;

A4: determining whether the maximum value is at the end of a current column by the following formula, if so, proceeding to A6; otherwise, proceeding to A5;

$$\text{max\_at\_end}(j) = \begin{cases} 1 & \text{if last\_max\_positions}(j) = \text{rows} - 1 \\ 0 & \text{otherwise} \end{cases};$$

where max_at_end(j) represents that the maximum value is at the end of the current column, and rows represents a row number of a current position:

A5: determining whether the maximum value is at the end of the current column by the following formula, and proceeding to A6:

$$\text{max\_at\_end}(j) = \begin{cases} 1 & \text{if max\_value}(j) \geq 12 \\ 0 & \text{otherwise} \end{cases};$$

where max_value(j) represents a maximum echo threshold;

A6: adding the determined maximum value and the position thereof to the List1;

A7: creating an empty list List2 and an empty list List3 separately, where List2 is used to store column names extracted from the list List1; the list List3 is used to store continuous areas that all contain high echo values;

A8: traversing each element in the list List1, obtaining a continuous segment, and recording a start index and an end index of the continuous segment, where when the continuous segment is traversed, a length of the segment is calculated, and the continuous segment is a continuous column name;

A9: determining whether the length of the segment is greater than a preset threshold, if so, storing an initial column name and the length as a tuple in the list List3, and proceeding to A10, otherwise, returning to A8;

A10: traversing tuples in the list List3 and the list List1, determining whether the initial column name i" in the list List3 is equal to a column name k in the list List1, if so, proceeding to A11, and otherwise, repeating A10; where the tuple in the list List1 represents a column name and a position, and the tuple in the list List3 represents an initial column name and a length;

A11: determining whether there are a plurality of continuous zeros after the position according to a determination result, if so, marking an area and proceeding to A12, otherwise, returning to A10; and A12: when values following the high echo in the marked area are all 0, marking the area as a V-shaped notch, and outputting position information of the V-shaped notch to complete the determination of whether there is the V-shaped notch in the radar strong echo area.

Further, the determining whether there is TBSS in the radar strong echo area is specifically as follows:

B1: creating an empty list List4, letting $t_1$ be a high echo value threshold, let $t_2$ be a continuous segment threshold, where the continuous segment is a continuous column name; the list List4 is used to store position information of the continuous segment of the high echo value;

B2: for each index of each column C in the dictionary, if a high echo value of an $i'^{th}$ index C[i'] in the column C is greater than or equal to the high echo value threshold $t_1$, recording the $i'^{th}$ index as a high echo value position; if the $i'^{th}$ index and an $i'+1^{th}$ index are continuous high echo value positions, recording the $i'^{th}$ index and the $i'+1^{th}$ index as a starting position and an ending position of the continuous segment;

B3: calculating a length of each recorded continuous segment, and if the calculated length is greater than or equal to the continuous segment threshold $t_2$, storing the position information of the continuous segment as a tuple (c,s,e) in the list List4, where c represents the column name, s represents the starting position, and e represents the ending position;

B4: creating a list List5, and letting $t_3$ be a length threshold of TBSS, where the list List5 is used to store the position information of the TBSS;

B5: for each tuple (c,s,e), checking values in each column C starting from the starting position e, and obtaining a position z where a first value is 0;

B6: calculating a difference d between the position z and the starting position e, that is, a length d from the high echo value to the first value 0;

B7: if the length d is greater than or equal to the length threshold $t_3$ of the TBSS, storing the tuple (c,s,e) into the list List5;

B8: letting R be a radar image whose elements are echo values and letting $t_4$ be a height threshold of the TBSS; and B9: for each tuple (c,s,e) in the List5, marking a position of the TBSS in the radar image R, and completing the determination of the TBSS by the radar strong echo area.

The beneficial effects of the present disclosure are as follows.

Aiming at the most basic radar reflectivity factor image, the present disclosure achieves automatic analysis and processing of meteorological radar images and completes the work of automatically identifying hail. Text information, such as date, time and position, as well as radar latitude and longitude, altitude, scanning range and other parameters are extracted from the radar image. The core features of hail on the radar image, namely high-intensity echo, V-shaped notch and TBSS, are used to transform the above features into spatial gradients and geometric forms of specific information by spatial mapping transformation of the radar image. In a new image mapping space, the complexity of the mathematical expression of the core information is greatly reduced. On this basis, an algorithm for identifying hail by radar images is constructed, and the efficiency and accuracy of the identification are ensured. The most basic radar reflectivity product is used to ensure the convenience and accuracy of business applications, and quick and automatic identification of hail is achieved. Key indicators such as the geographical position of hail and hail intensity may be output, so that a quick and accurate method is provided for the automation of monitoring and early warning of the hail and eliminating the continuous high-intensity analysis pressure of a forecaster.

DESCRIPTION OF EMBODIMENTS

The following description of the specific embodiments of the present disclosure is provided to facilitate the understanding of the present disclosure by those skilled in the art, however, it should be understood that the present disclosure is not limited to the scope of the specific embodiments, and for those of ordinary skill in the art, various changes that are made without departing from the spirit and scope of the present disclosure as defined and determined by the appended claims are apparent, and all inventions and creations that are made by using the concept of the present disclosure are within the protective scope.

Embodiment

Before the present disclosure is described, the following terms are explained:

A V-shaped notch refers to a reflective structure formed in a radar echo image due to the obstruction of electromagnetic waves by the shape and physical characteristics of hail particles.

Three body scatter signature (TBSS): If a hail C has a large size and a strong reflective ability, the electromagnetic waves emitted by the radar are reflected in various directions such as the ground after encountering the hail C, and then reflected back to the hail from the ground; and finally part of the electromagnetic waves are reflected back to the radar antenna, thus forming a false echo. This false echo reaches the radar antenna later after multiple reflections. The radar determines the distance based on the arrival time of the reflected electromagnetic waves. The farther away, the later the return time, so that the late signals passing through the three-body relay of hail-ground-hail on a radar image are mistaken as objects farther away. Therefore, behind large hail, the false signal with very low echo intensity occurs. Only very large hail can reflect electromagnetic waves multiple times. This phenomenon is called three body scatter signature, i.e., TBSS.

Figure 1:
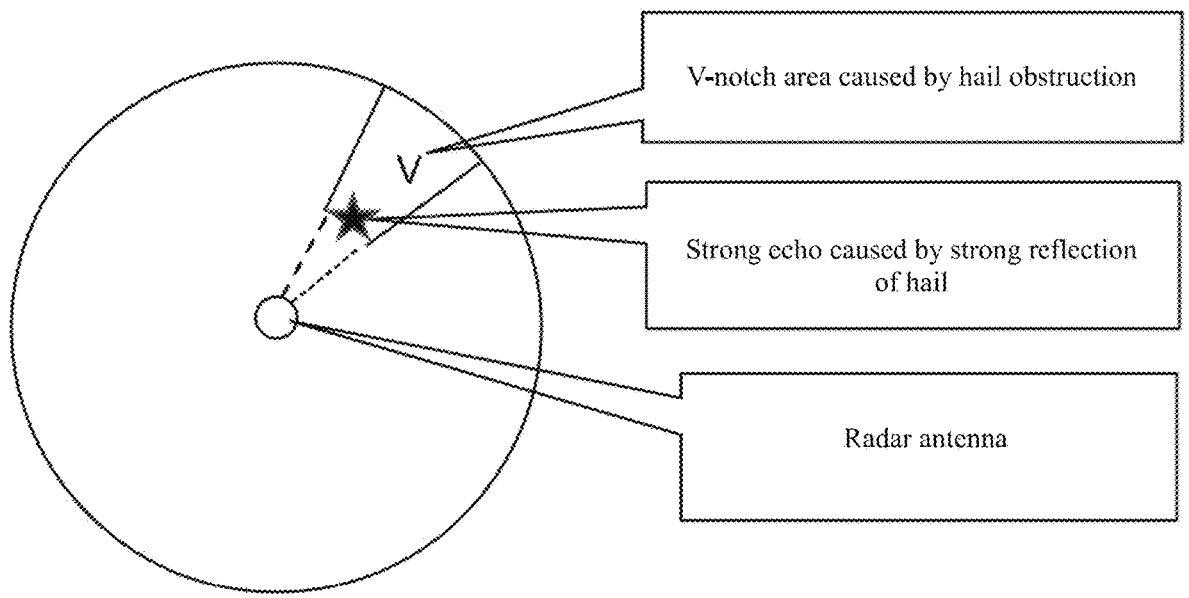
FIG. 1 is a schematic diagram of a V-shaped notch on a radar echo image caused by hail in the background.
Figure 2:
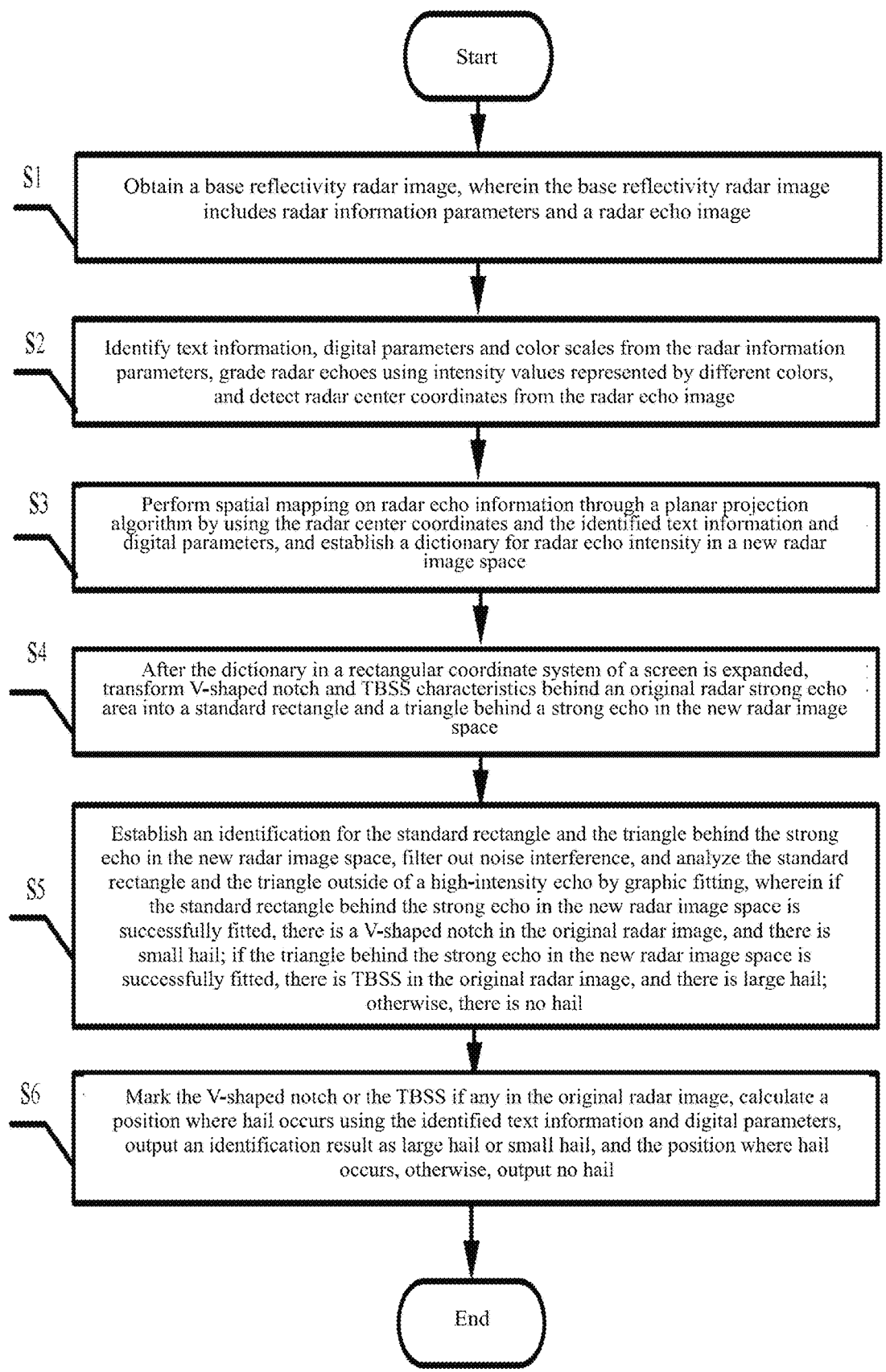
FIG. 2 is a flow chart of a method according to the present disclosure.

As shown in FIG. 2, the present disclosure provides an automatic hail identification method based on radar image spatial mapping, which is implemented as follows:

S1: obtaining a base reflectivity radar image, where the base reflectivity radar image includes radar information parameters and a radar echo image;

S2: identifying text information, digital parameters and color scales from the radar information parameters, grading radar echoes using intensity values represented by different colors, and detecting radar center coordinates from the radar echo image; where the S2 is implemented as follows:

S201: identifying text information and digital parameters in a text description from a description of the base reflectivity radar image and a radar information parameter area;

S202: identifying parameters and color scales from the description of the base reflectivity radar image and a radar information parameter area, and grading radar echoes by intensity values represented by different colors; where the parameters include radar latitude and longitude, altitude, scanning range, and the like;

S203: detecting radar center coordinates from the radar echo image according to a grading result, where the detection is performed at each angle in sequence from the radar center from inside to outside in a clockwise direction from due north until the detection of an entire radar echo image is completed, where the digital parameters include radar longitude and latitude, altitude, scanning range, and the like;

S3: performing spatial mapping on radar echo information through a planar projection algorithm by using the radar center coordinates and the identified text information and digital parameters, and establishing a dictionary for radar echo intensity in a new radar image space; where the S3 is implemented as follows:

S301: according to the radar center coordinates and the identified text information and digital parameters, storing radar echo intensity levels of points in an original radar echo image into a dictionary after radar echo information of points is subjected to spatial mapping according to a planar projection algorithm, where the points are all points in the original radar echo image;

S302: determining whether an angle of a certain point from the radar center exists in a key of the dictionary, if so, storing coordinates and a radar echo intensity level of the point into the dictionary, and proceeding to S303, otherwise, establishing a key value pair in the dictionary to store the coordinates and the radar echo intensity level of the point, and proceeding to S303; where the point is a currently processed point in the original radar echo image;

S303: establishing a dictionary for radar echo intensity in a new radar image space after the spatial mapping is completed;

the spatial mapping is specifically as follows:

in the original radar echo image, a position of each point is represented by screen coordinates (x,y) and is subjected to spatial mapping by using the following formula:

$$\theta = tg^{-1}\frac{x - x_0}{y - y_0};$$

$$r = \sqrt{(x - x_0)^2 + (y - y_0)^2};$$

where (θ,r) represents polar coordinates of each point of the radar echo, θ represents an angle, r represents a distance to a center of a circle, (x,y) represents screen coordinates, $x_0$ represents an abscissa of a radar station, $y_0$ represents an ordinate of a radar station, $x_0$ and $y_0$ together represent a position of an origin in the original radar echo image, tg represents a tangent function in a trigonometric function, and $tg^{-1}$ represents an inverse function of the tangent function.

S4: after expanding the dictionary in a rectangular coordinate system of a screen, transforming V-shaped notch and TBSS characteristics behind an original radar strong echo area into a standard rectangle and a triangle behind a strong echo in the new radar image space;

S5: establishing an identification for the standard rectangle and the triangle behind the strong echo in the new radar image space, filtering out noise interference, and analyzing the standard rectangle and the triangle outside of a high-intensity echo by graphic fitting, where if the standard rectangle behind the strong echo in the new radar image space is successfully fitted, there is a V-shaped notch in the original radar image, and there is small hail; if the triangle behind the strong echo in the new radar image space is successfully fitted, there is TBSS in the original radar image, and there is large hail; otherwise, there is no hail; where the S5 is implemented as follows:

S501: filtering out noise interference of the new radar image;

S502: setting a radar echo intensity level greater than or equal to 12 as a hail target;

S503: analyzing a position behind the hail target by graphic fitting on outside of a high-intensity echo in a new radar image space after spatial projection according to the conditions set in the S502;

S504: determining whether there is a V-shaped notch and TBSS in the radar strong echo area according to a result of the graphic fitting analysis and whether there is a standard rectangle or a triangle behind the strong echo, where if the standard rectangle behind the strong echo in the new radar image space is successfully fitted, there is a V-shaped notch in the original radar echo image, and there is small hail; if the triangle behind the strong echo in the new radar image space is successfully fitted, there is TBSS in the original radar echo image, and there is large hail; otherwise, there is no hail, and the process ends;

the determining whether there is a V-shaped notch in the radar strong echo area is specifically as follows:

A1: creating an empty list List1 for storing V-shaped notch position information;

A2: taking the transformed dictionary as a matrix M, where $M_{i,j}$ represents an element in an $i^{th}$ row and $j^{th}$ column:

$$\text{max\_positions}(j) = \max_i(M_{i,j});$$

where max represents a maximum value, max_positions(j) represents a position where the maximum value occurs, and $$\max_i(M_{i,j})$$

represents a result of taking maximum values of all elements in the $i^{th}$ row;

A3: if there is a same maximum value in the same column, determining a position where the maximum value occurs last: last_max_positions(j)=max_positions(j)$_{lastoccurrence}$; where last_max_positions(j) represents a position where the maximum value occurs last, and max_positions(j)$_{lastoccurrence}$ represents finding a position where a last maximum value occurs in the same column;

A4: determining whether the maximum value is at the end of a current column by the following formula, if so, proceeding to A6; otherwise, proceeding to A5;

$$\text{max\_at\_end}(j) = \begin{cases} 1 & \text{If last\_max\_positions}(j) = \text{rows} - 1 \\ 0 & \text{Otherwise} \end{cases};$$

where max_at_end(j) represents that the maximum value is at the end of the current column, and rows represents a row number of a current position;

A5: determining whether the maximum value is at the end of the current column by the following formula, and proceeding to A6:

$$\text{max\_at\_end}(j) = \begin{cases} 1 & \text{If max\_value}(j) \geq 12 \\ 0 & \text{Otherwise} \end{cases};$$

where max_value(j) represents a maximum echo threshold;

A6: adding the determined maximum value and the position thereof to the List1;

A7: creating an empty list List2 and an empty list List3 separately, where List2 is used to store column names extracted from the list List1; the list List3 is used to store continuous areas that all contain high echo values;

A8: traversing each element in the list List1, obtaining a continuous segment, and recording a start index and an end index of the continuous segment, where when the continuous segment is traversed, a length of the segment is calculated, and the continuous segment is a continuous column name;

A9: determining whether the length of the segment is greater than a preset threshold, if so, storing an initial column name and the length as a tuple in the list List3, and proceeding to A10, otherwise, returning to A8;

A10: traversing tuples in the list List3 and the list List1, determining whether the initial column name $i^{th}$ in the list List3 is equal to a column name k in the list List1, if so, proceeding to A11, and otherwise, repeating A10; where the tuple in the list List1 represents a column name and a position, and the tuple in the list List3 represents an initial column name and a length;

A11: determining whether there are a plurality of continuous zeros after the position according to a determination result, if so, marking an area and proceeding to A12, otherwise, returning to A10;

A12: when values following the high echo in the marked area are all 0, marking the area as a V-shaped notch, and outputting position information of the V-shaped notch to complete the determination of whether there is the V-shaped notch in the radar strong echo area;

the determining whether there is TBSS in the radar strong echo area is specifically as follows:

B1: creating an empty list List4, letting $t_1$ be a high echo value threshold, let $t_2$ be a continuous segment threshold, where the continuous segment is a continuous column name; the list List4 is used to store position information of the continuous segment of the high echo value;

B2: for each index of each column C in the dictionary, if a high echo value of an $i'^{th}$ index C[i'] in the column C is greater than or equal to the high echo value threshold $t_1$, recording the $i'^{th}$ index as a high echo value position; if the $i'^{th}$ index and an $i'+1^{th}$ index are continuous high echo value positions, recording the $i'^{th}$ index and the $i'+1^{th}$ index as a starting position and an ending position of the continuous segment;

B3: calculating a length of each recorded continuous segment, and if the calculated length is greater than or equal to the continuous segment threshold $t_2$, storing the position information of the continuous segment as a tuple (c,s,e) in the list List4, where c represents the column name, s represents the starting position, and e represents the ending position;

B4: creating a list List5, and letting $t_3$ be a length threshold of TBSS, where the list List5 is used to store the position information of the TBSS;

B5: for each tuple (c,s,e), checking values in each column C starting from the starting position e, and obtaining a position z where a first value is 0;

B6: calculating a difference d between the position z and the starting position e, that is, a length d from the high echo value to the first value 0;

B7: if the length d is greater than or equal to the length threshold $t_3$ of the TBSS, storing the tuple (c,s,e) into the list List5;

B8: letting R be a radar image whose elements are echo values and letting $t_4$ be a height threshold of the TBSS;

B9: for each tuple (c,s,e) in the List5, marking a position of the TBSS in the radar image R, and completing the determination of the TBSS by the radar strong echo area; and S6: marking the V-shaped notch or the TBSS if any in the original radar image, calculating a position where hail occurs using the identified text information and digital parameters, outputting an identification result as large hail or small hail, and the position where hail occurs, otherwise, outputting no hail.

Figure 3:
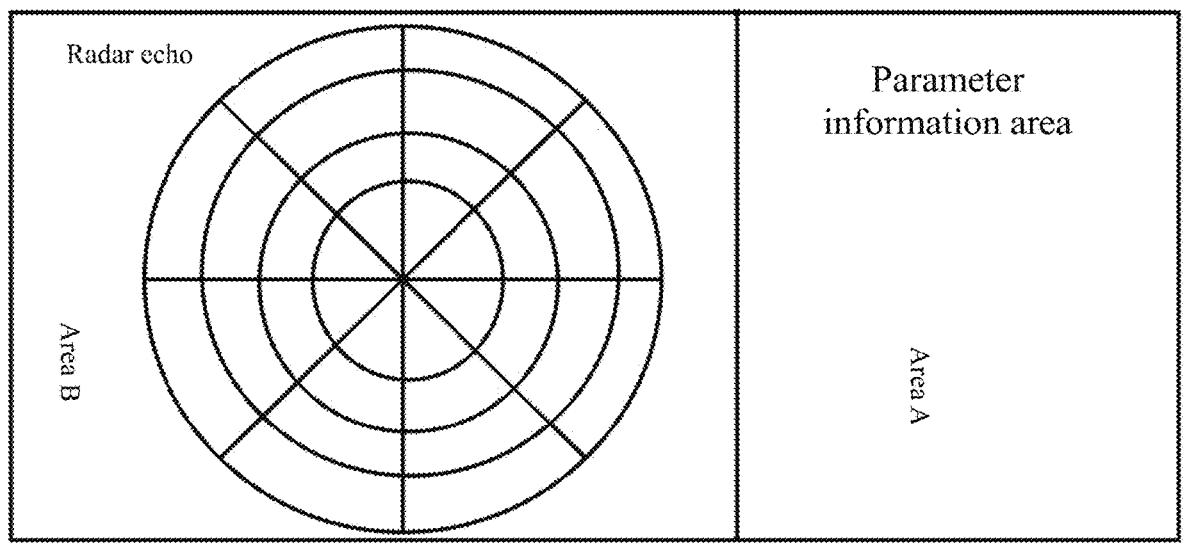
FIG. 3 is a schematic diagram of a radar image display area according to an embodiment.

In this embodiment, the input required by the present disclosure is the base reflectivity image automatically generated by the meteorological radar during operation, and the image includes radar information parameters and a radar echo image, as shown in FIG. 3, such as a radar echo area B (i.e., the radar echo image) and a parameter information area A (i.e., radar information parameters) in FIG. 3.

In this embodiment, the parameter information area refers to the key information on the radar image, such as the radar station name, radar type, radar band, longitude and latitude and altitude of the radar, radar detection distance, current observation time, observation elevation angle, and radar echo parameters. The parameter information area also contains additional information such as radar scanning mode, instrument model, and data update frequency.

The most important information is the color scale used in FIG. 3, that is, the intensity value of the reflectivity factor represented by different colors, the unit is dBZ. The difference in the intensity of electromagnetic echoes from atmospheric particles received by radar is extremely huge, and is at an astronomical level. For the convenience of display, the intensities are logarithmically calculated to obtain the data on the radar image. For example, if the data of a certain point on the image is 50, the electromagnetic wave intensity the point represents is ten to the fiftieth power. That is, there are 50 zeros after 1, and the value is indeed extremely huge.

In the parameter information area A of the radar image, it may be found that the maximum value of the radar reflectivity factor is often 65 dBZ, and the minimum value is −10 dBZ. This information is used in subsequent image processing procedures. The latitude and longitude of the radar station and the altitude of the radar weather in the information may be used for calculating the relative position of the target. The combination of geographic information and time may be used for automatically issuing early warning.

Figure 4:
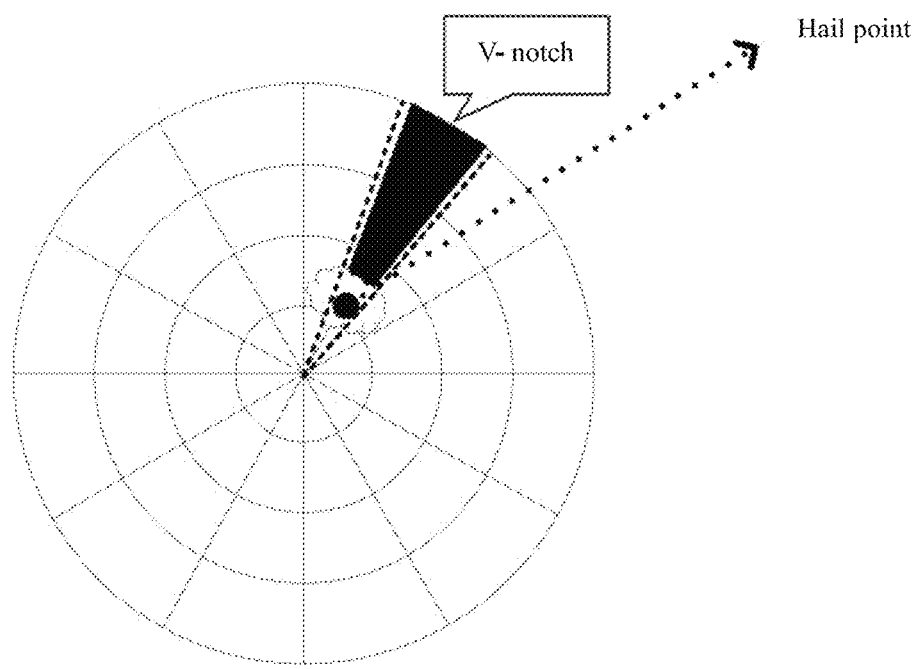
FIG. 4 is a schematic diagram of a V-shaped notch of a meteorological radar echo according to an embodiment.
Figure 5:
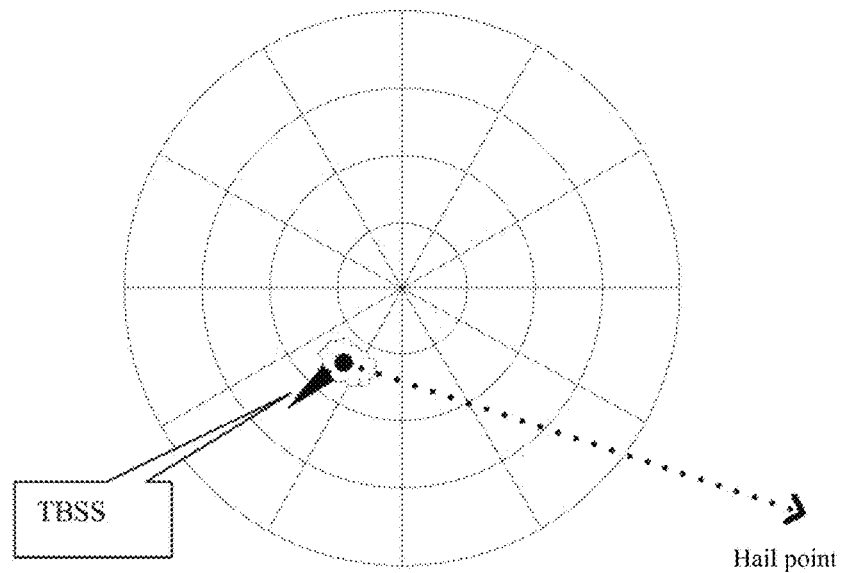
FIG. 5 is a schematic diagram of TBSS of a meteorological radar echo according to an embodiment.

The area B is a radar echo area, the image reflects radar detection results, and the color of pixels in the image is the echo intensity represented by a color scale. High-intensity reflection areas usually indicate the presence of particles causing heavy precipitation or even hail. The V-shaped notch and TBSS in the image are key target features of the present disclosure. The V-shaped notch and TBSS in the radar image are shown in FIGS. 4 and 5. The dots in FIGS. 4 and 5 represent hail points. In FIG. 4, the black area represents the V-shaped notch, and the dotted arrows represent hail points. In FIG. 5, the black area represents TBSS, and the dotted arrow represents hail points.

In this embodiment, the identification of the color scale in the parameter information area: the color information may be extracted from the color bar in the text description of the meteorological radar image, that is, the RGB value corresponding to each color (RGB value is a way to represent color, usually used for digital image description. In the RGB model, color is composed of the intensities of three basic colors: red, green, and blue. The intensity value of each color channel is usually in the range of 0 to 255, where 0 represents the minimum intensity and 255 represents the maximum intensity), as well as the radar echo intensity value represented by the color. A level of the radar echo intensity value is read, and the level of the radar echo intensity value in the no-echo area is 0. This information is stored in an array, and then the corresponding data of the radar echo intensity value level is automatically identified according to the color RGB value in the image.

In this embodiment, other parameter information in the parameter information area is extracted: this step is intended to identify the annotation text in the meteorological radar image and extract parameter information such as the geographical position and working mode of the radar. To process the base radar reflectivity image input in the S1, a designated radar image file to be identified is read. Next, the color image is transformed into a grayscale image to simplify the complexity of image processing. The grayscale image is then binarized (binarization is a common operation in image processing, which limits the pixel values of an image to two values, usually 0 and 255. The image is transformed into black and white to simplify the image and highlight the features of the target), and the image is transformed into black and white to facilitate subsequent text identification. Then, operations such as denoising and tilt correction are performed to improve the quality and clarity of the image. The text regions and text lines in the image are determined using connected domain analysis, projection method, edge detection and other methods, and then whitespace segmentation, horizontal cutting, vertical cutting and other methods are performed to divide the text lines into individual characters or character groups. Each character or group of characters is classified and identified using a neural network machine learning algorithm. Finally, the identification results are corrected and optimized using dictionaries, grammar rules, statistical information and other methods. The identification results are output and saved, so that the text information extracted from the image may be viewed and displayed. This processing may be used to extract important parameters on the meteorological radar image, including geographic position (longitude, latitude, and altitude), time, detection range and other related information.

In this embodiment, the circular radar echo image detection: the radar antenna emits electromagnetic waves outwards for detection, the antenna rotates for a circle in the horizontal direction, and the obtained echoes form a circular radar echo image. Straight lines are often drawn on the circle from the position of the radar antenna to the north, south, west, east, northeast, northwest, southeast, and southwest to assist forecasters in determining the direction. Circles of different sizes are drawn around the radar at different distances to assist forecasters in determining the echo distance, as shown in the radar echo area in FIG. 3. The detection of these concentric circles from the radar echo image is the basis for determining the specific position of the echo.

Hough circle detection is a technology for detecting circles in an image. The basic idea of this technology is to regard each point in the radar echo as a point on the circumference, and then vote in the accumulator space to find the highest peak in the accumulator, that is, to find the most likely circle. It is an image processing method based on the Hough transform. Firstly, the circular targets are detected from the radar echoes by using the Hough circle detection algorithm, and the radius sizes and common center points $(x_0, y_0)$ of the circular targets are obtained. It should be noted that $(x_0, y_0)$ is the position of the radar in the real physical world and is the origin of the concentric circles in the radar image, which together represent the origin of the original radar echo image, that is, the position of the radar. In the coordinate system, coordinates are expressed in the screen coordinate system. This is a unified expression of the position of the radar at the physical level, image level, and coordinate level, which is completely consistent, so the same symbol is used.

In this embodiment, a plurality of concentric circles may be identified by detecting the radar image. According to the radar detection range S extracted from the parameter information area and the total number of concentric circles n currently identified, the corresponding distance d=S/n between adjacent concentric circles may be obtained. The circle with the largest area is the entire echo area detected by the radar.

Figure 6:
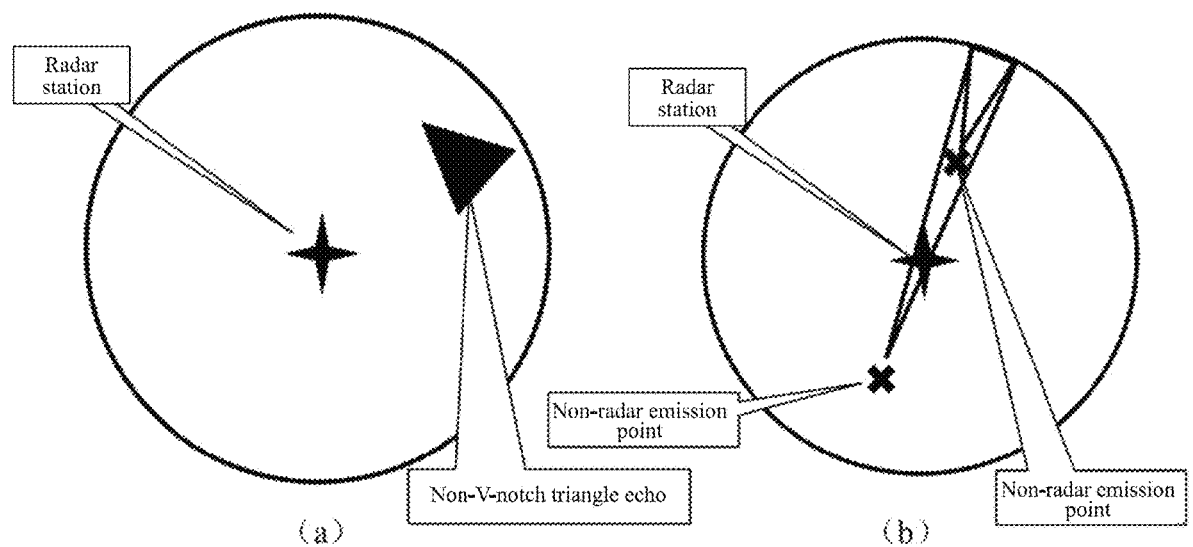
FIG. 6 is a schematic diagram of a non-V-shaped notch according to an embodiment.

In this embodiment, the purpose of the mathematical mapping of the radar echo image screen conversion space is to identify hail on the radar echo image, that is, to find the V-shaped notch and TBSS in the image. The V-shaped notch is a triangular 0-echo area after a strong echo, in which the most critical requirement is that the corner of the triangle points to the origin of the radar echo image. The TBSS refers to a continuous weak echo region after a strong echo, and the key is that the origin of a radar echo image, hail and the TBSS is strictly on a straight line. As shown in FIG. 6 (*a*) (the five-pointed star in FIG. 6 (*a*) represents the radar station, and the triangle represents the non-V-shaped notch triangular echo), although there is a triangle, it is not a V-shaped notch, and its corner does not point to the radar, that is, the center of the circle. As shown in FIG. 6 (*b*), although the triangle points to the center of the circle (the five-pointed star in FIG. 6 (*b*) represents the radar station, and x represents a non-radar transmitting point), the intersection point of the edges of the triangle is not at the center of the circle, which indicates that the radiated electromagnetic waves are not emitted from the radar station. Two cases in FIG. 6 may occur. One case is that a triangular area of no echo or weak echo occurs on the radar image, but the sharp corner of the triangle does not point to the radar station, as shown in FIG. 6(*a*). Another case is that the sharp corner does point in the direction of the radar station, but analysis of the electromagnetic radiation shows that the electromagnetic radiation are not emitted by the radar station, as shown by a wrong position at x in FIG. 6 (*b*). Both two cases illustrate that the above-mentioned characteristics are not the normal reflection of hail to radar rays and are not the search targets of the present disclosure. It is relatively troublesome to solve these two key problems directly on the original radar image. However, if mathematical mapping is performed and the current radar echo image is projected into another space, it may be easier to express mathematically and solve the problem.

Figure 7:
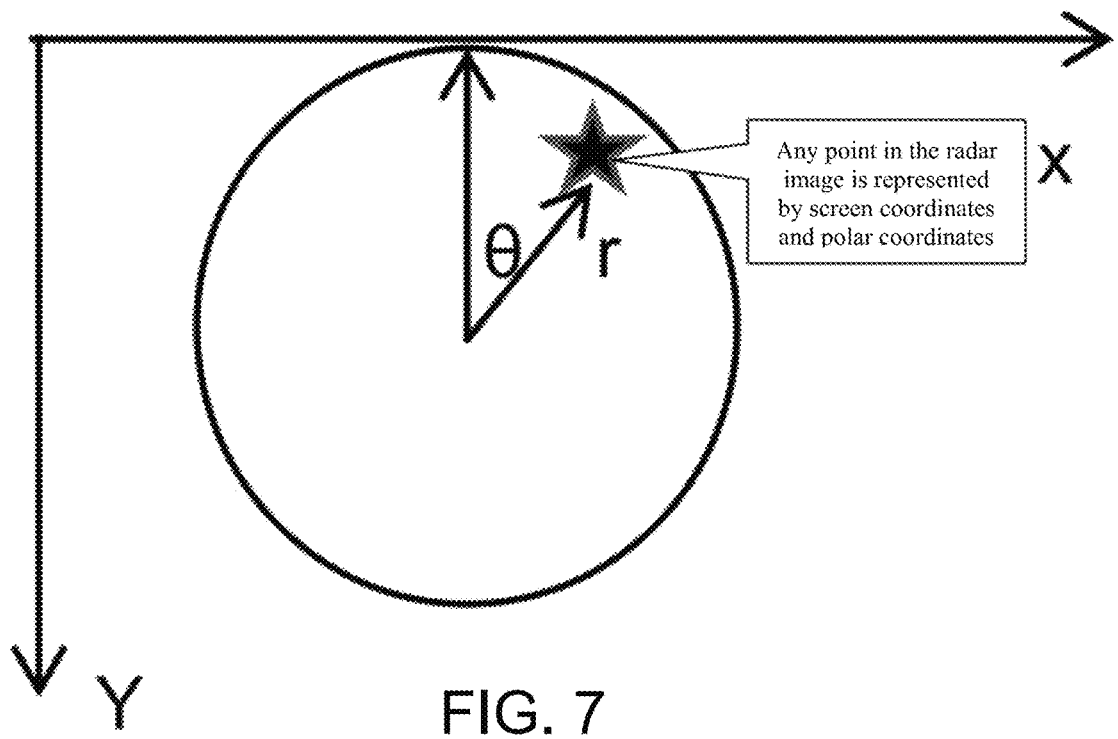
FIG. 7 is a schematic diagram of coordinates of a point on a screen in computer and polar coordinates according to an embodiment.

In this embodiment, the coordinate system specified in computer graphics is used for display on the computer screen. The screen coordinate system is a left-hand coordinate system as shown in FIG. 7. The coordinates of the point where the triangle is positioned are (x,y), (θ,r) represent the polar coordinates of each point of the radar echo, θ represents the angle, and r represents the distance to the center of the circle. In FIG. 7, the five-pointed star represents any point in the radar image represented by screen coordinates and polar coordinates respectively.

Unlike the definition of angles in general geometry, in meteorological business, due north is used as the reference angle θ, and angles are calculated in a clockwise direction.

When the radar works, the radar rotates clockwise every 1 degree from the due north, namely 0 degree, and then sequentially emits electromagnetic waves to form rays. There are a total of 360 rays in the entire figure. The distance from the center of the circle on each ray may be used to represent the position of each point on the ray. Each point in the image may be represented by polar coordinates (θ, r).

Figure 8:
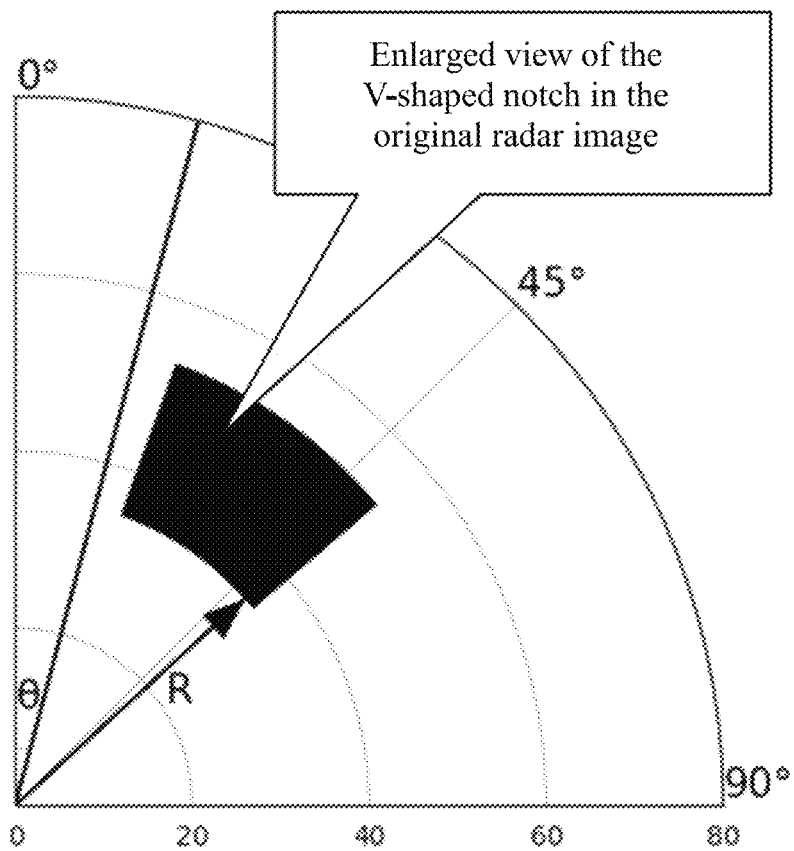
FIG. 8 is a schematic diagram of graphic representation in different image spaces according to an embodiment.
Figure 9:
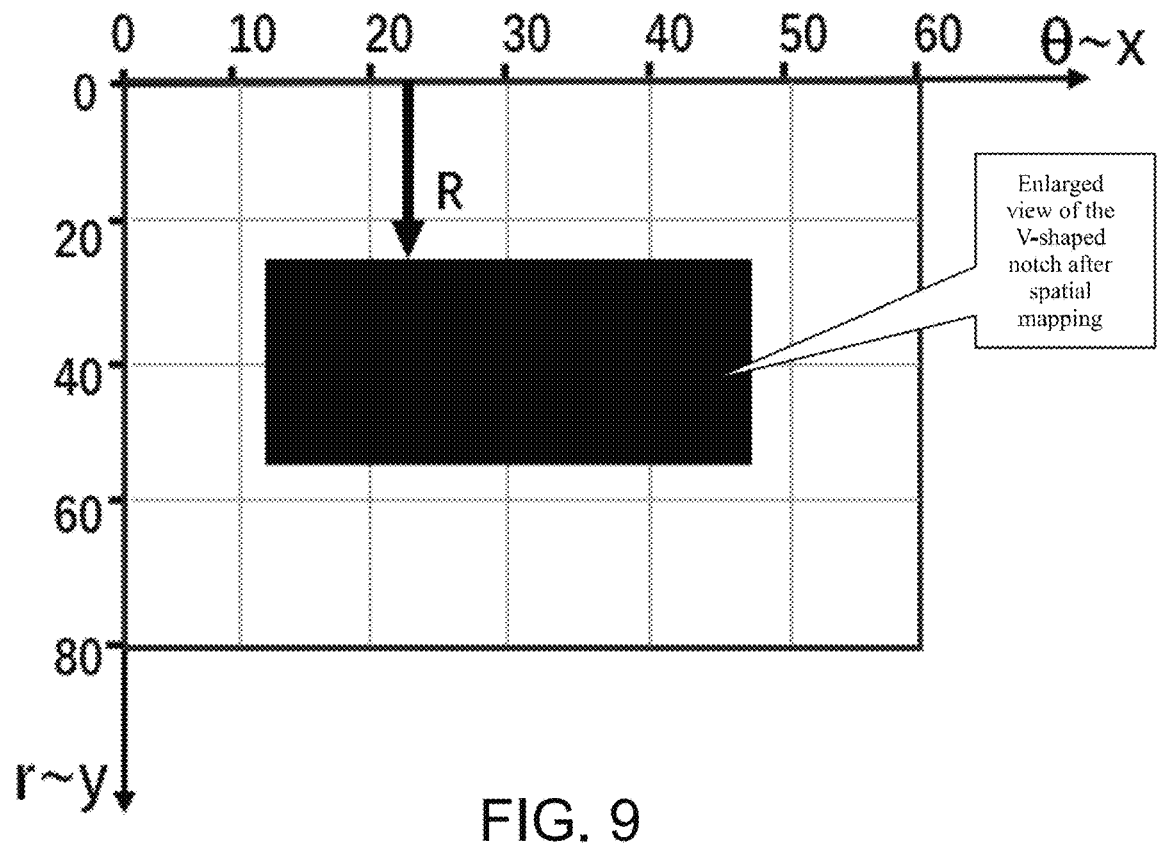
FIG. 9 is another schematic diagram of graphic representation in different image spaces according to an embodiment.

In the image space of the computer screen, the V-shaped notch is a triangle (ideally, a fan-shaped one) facing the center of the circle in the radar image, and may be represented as a rectangle in the polar coordinate image space as shown in FIGS. 8 and 9. Obviously, the description of polar coordinate image space is simpler and more convenient, and identification is faster and more reliable. As shown in FIG. 8 (the black area in FIG. 8 represents the enlarged view of the V-shaped notch in the original radar image): the original radar image displayed on the screen may calculate the polar coordinates of each point. As shown in FIG. 9 (the black area in FIG. 9 represents the enlarged view of the V-shaped notch after spatial mapping, θ represents the angle, R represents the scanning radius, r represents the distance to the center of the circle, r-y represents assigning r to the y direction, and θ~x represents assigning θ to the x direction): for the left image represented in polar coordinates, the angle coordinate θ is taken as x and the distance coordinate r is taken as y. The same area displayed on the computer screen occurs as a rectangle.

In this embodiment, in the screen coordinate system, the coordinates (x, y) of each point on the radar echo image may be represented by polar coordinates (θ,r) with the radar as the center. The mathematical relationship between the coordinates of each point in the two systems is $$x = x_0 + r \times \sin \theta$$
$$y = y_0 + r \times \cos \theta.$$

Note: the polar coordinate system of the entire radar echo image is a 360° circle. When the angle coordinates θ is between 180° and 360° and between 0° and 180° respectively, the calculation results of the trigonometric functions cos θ and sin θ are the same.

$x_0$ represents the abscissa of the circle center found previously, $y_0$ represents the ordinate of the circle center found above, and the polar coordinates (θ, r) of each point may be obtained by performing inverse transformation, that is, the mathematical projection formula for mapping and conversion in different radar echo image spaces:

$$\theta = tg^{-1} \frac{x - x_0}{y - y_0}; r = \sqrt{(x - x_0)^2 + (y - y_0)^2};$$

where (θ,r) represent the polar coordinates of each point of the radar echo, θ represents the angle, r represents the distance to the center of the circle, $x_0$ represents the abscissa of the radar station, $y_0$ represents the ordinate of the radar station, $x_0$ and $y_0$ together represent the position of the origin in the original radar echo image, tg represents the tangent function in the trigonometric function, and $tg^{-1}$ represents the inverse function of the tangent function.

Figure 10:
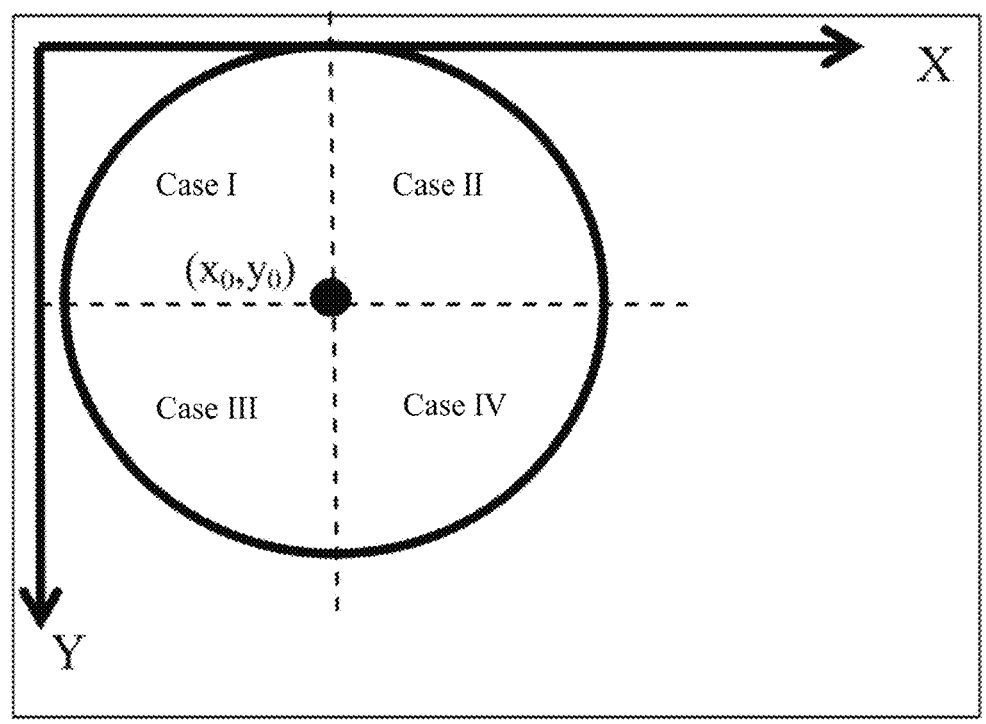
FIG. 10 is a schematic diagram of a value range space corresponding to angle calculation according to an embodiment.

Since the trigonometric function values are the same at different angles, the trigonometric function values are processed in different categories, as shown in FIG. 10.

1) Case I: $x-x_0 \geq 0$ and $y-y_0 > 0$, then $90° < \theta \leq 180°$.
2) Case II: $x-x_0 \geq 0$ and $y-y_0 < 0$, then $0° < \theta < 90°$.
3) Case III: $x-x_0 \leq 0$ and $y-y_0 > 0$, then $180° < \theta \leq 270°$.
4) Case IV: $x-x_0 \leq 0$ and $y-y_0 < 0$, then $270° < \theta \leq 360°$.
5) When in operation, the special case that the denominator is 0 is firstly analyzed: when y is equal to $y_0$, $x > x_0$, the angle θ is set to 90°, and the point is on the numerical axis; when y is equal to $y_0$, $x < x_0$, the angle is set to 270°, the point is positioned on the numerical axis. In this figure, a black circle represents an origin in the original radar echo image, and $x_0$ and $y_0$ together represent the position of the origin in the original radar echo image.

In this embodiment, in the original radar echo image, i.e., the area B, each pixel is already represented by (x, y), and when image spatial mapping is performed, a mathematical projection formula is used to obtain the polar coordinates (θ,r) with the radar as a center of a circle. The points in the circular image with the largest area of the radar echo area (i.e., all echoes) are calculated one by one to obtain a two-dimensional image array represented by angle and distance (θ,r). On the screen, the abscissa is taken as θ and the ordinate is taken as r, that is, x=θ, y=r, then the mapping of the image space is completed. In this case, the fan shape of the original radar echo image is transformed into the rectangle of the current image, that is, the V-shaped notch occurs as a rectangle.

Figure 11:
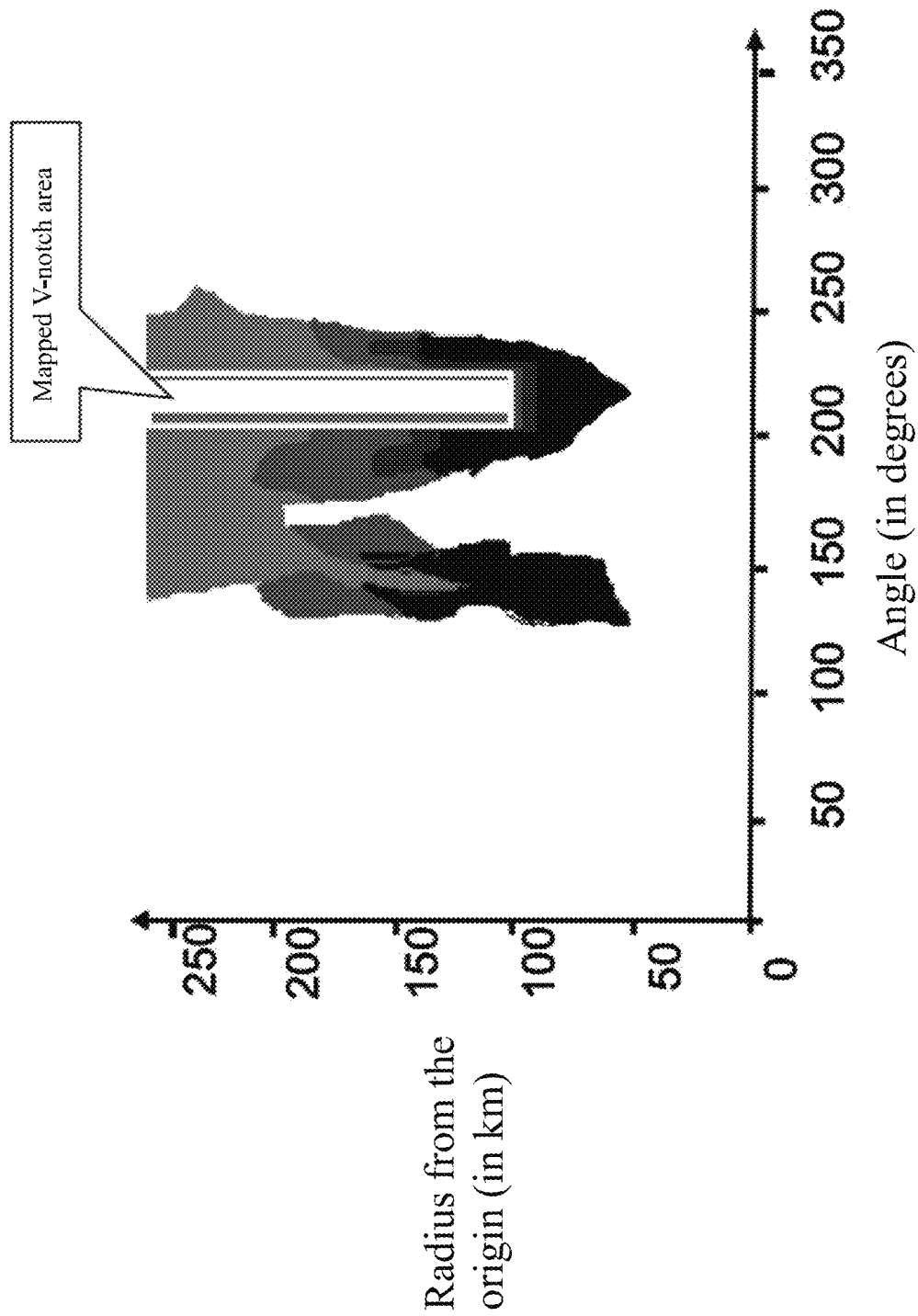
FIG. 11 is a schematic diagram of a visualization effect of a V-shaped notch in a dictionary according to an embodiment.
Figure 12:
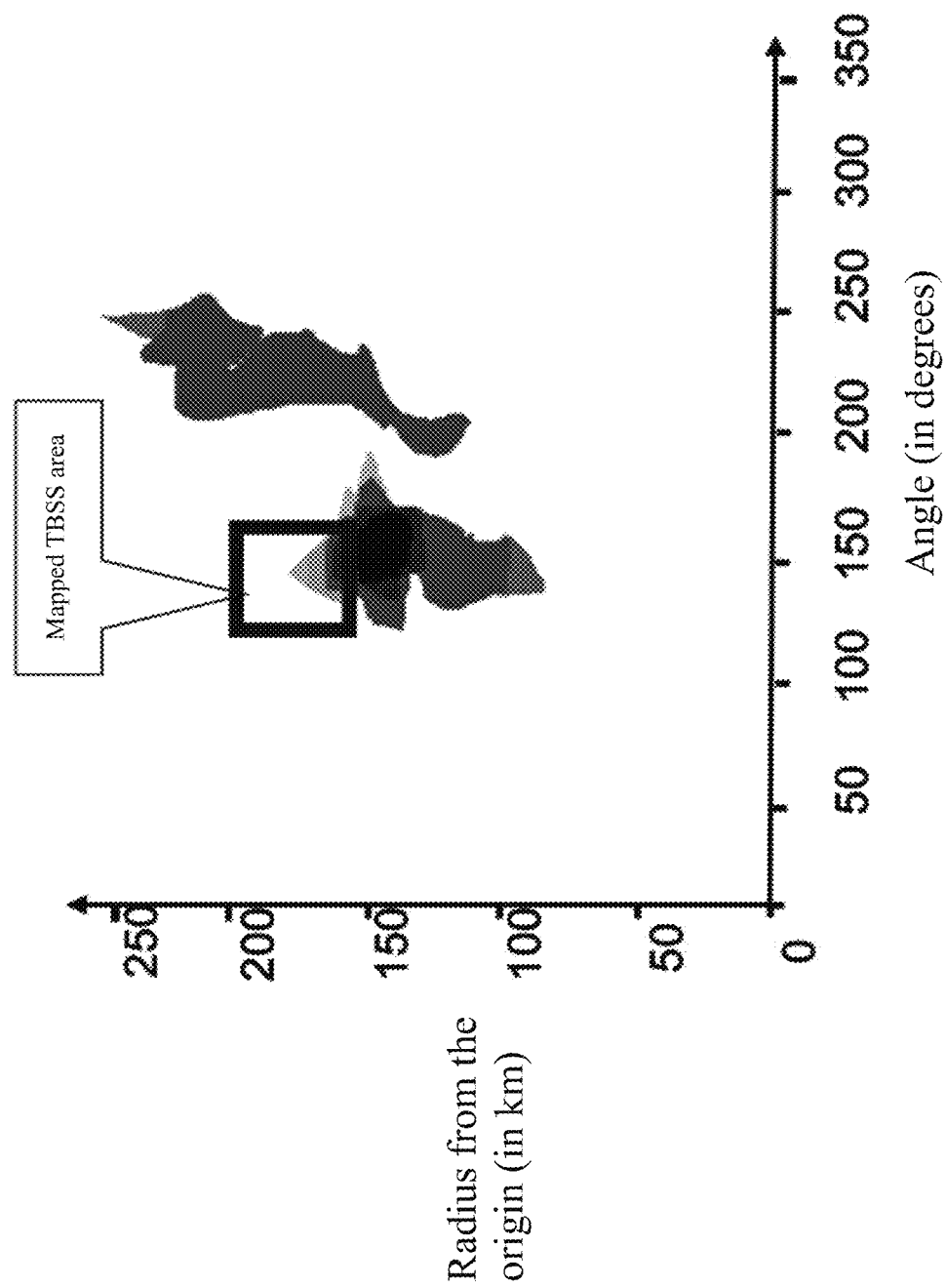
FIG. 12 is a schematic diagram of a visualization effect of TBSS in a dictionary according to an embodiment.

In this embodiment, in the radar information parameter processing step in the parameter information area, the color value RGB of the color scale and the corresponding reflectivity factor value have been read. When the echo image of the radar echo area is read, a dictionary variable is used to store the echo intensity value level at each angle. The echo intensity value level of the pixels at the same angle is stored in the value list corresponding to the same dictionary key (the key name is the angle size). In this way, the number and distribution of echo intensity value levels at each position at each angle may be counted, thereby obtaining a column index as the radius from the circular point and a row index as the angle. In this embodiment, the radar echo image is transformed into matrix data of radar echo intensity value levels at each position. The data in the dictionary is then visualized using a function for displaying images, showing the relative numerical size of each cell in the matrix or table data. The transformed image and the areas of the V-shaped notch and TBSS are shown in FIGS. 11 and 12. In FIGS. 11 and 12, the abscissa is angle in degrees and the ordinate is the radius from the circle in km. The notch in FIG. 11 represents the mapped V-shaped notch area, and the black box in FIG. 12 represents the mapped TBSS area. In this embodiment, the V-shaped notches are identified as follows:

An empty list (List1) is created to store eligible (belonging to a V-shaped notch) position information. The dictionary obtained from the above process is processed:

1. A maximum value in each column and a position thereof are found.
    taking the input data as a matrix M, where $M_{i,j}$ represents an element in an $i^{th}$ row and $j^{th}$ column:

$$\text{max\_positions}(j) = \max_i (M_{i,j});$$

where max represents a maximum value, max_positions(j) represents a position where the maximum value occurs, and $$\max_i (M_{i,j})$$

represents a result of taking maximum values of all elements in the $i^{th}$ row;
if there is a same maximum value in the same column, finding a position where the maximum value occurs last: last_max_positions(j)=max_positions(j)$_{lastoccurrence}$; where last_max_positions(j) represents a position where the maximum value occurs last, and max_positions(j)$_{lastoccurrence}$ represents finding a position where a last maximum value occurs in the same column;
determining whether the maximum value is at the end of the current column is determined:

$$\text{max\_at\_end}(j) = \begin{cases} 1 & \text{If last\_max\_positions}(j) = \text{rows} - 1 \\ 0 & \text{Otherwise} \end{cases};$$

where max_at_end(j) represents that the maximum value is at the end of the current column, and rows represents a row number of a current position; and if the maximum value is not at the end, performing further determination:

$$\text{max\_at\_end}(j) = \begin{cases} 1 & \text{If max\_value}(j) \geq 12 \\ 0 & \text{Otherwise} \end{cases},$$

where max_value(j) represents the maximum echo threshold.

Through extensive analysis and observation as well as academic research results, the threshold for high echoes is set to 12 and above (value≥12), that is, the actual radar echo intensity is 50 dBz and above.

When it is found that the zeros are behind the column (after max_value=0), the position of the first zero is recorded and the position information is added to List1. This operation is designed to meet the condition that a V-shaped notch occurs after a high echo.

2. An empty list List2 is created to store the column names extracted from list List1. Meanwhile, another empty list List3 is created, each element in the list List1 is traversed, continuous segment (that is, continuous column name) is found, and starting and ending indexes of the segment are recorded. When the found continuous segment is traversed, the length of the segment is calculated. If the length is greater than or equal to the set value N (length≥10 (set to 10 here through comparative experiments)), the starting column name and length are stored as a tuple (i, length) in the list List3, otherwise the traversal continues. The list List3 is used to store a certain continuous area containing high echo values.

3. The tuple in the list List3 is set to (i, length), which represents the starting column name and length of a continuous area that contains high echo values. The list List1 is set as a list containing position information, in which the elements represent the first position of continuous zeros starting from a certain column: List3=[$(i_1,\text{length}_1)$, $(i_2,\text{length}_2)$, . . . , $(i_m, \text{length}_m)$]; List1=[$(k_1,v_1)(k_2,v_2)$, . . . , $(k_m,v_m)$], where $i_1$ in $(i_1,\text{length}_1)$ means finding the first column name containing continuous high echo values, and $\text{length}_1$ represents the length of the continuous high echo contained in the column; $i_2$ in $(i_2,\text{length}_2)$ means finding the second column name containing continuous high echo values, and $\text{length}_2$ represents the length of the continuous high echo contained in the column; $i_m$ in $(i_m, \text{length}_m)$ means finding the $m^{th}$ column name containing continuous high echo values, and length, represents the length of the continuous high echo contained in the column; $k_1$ in $(k_1, v_1)$ means finding the column name with high echo and subsequent data values being all continuously 0, and $v_1$ is the position of the first 0 occurring in the column; $k_2$ in $(k_2, v_2)$ means finding the column name with high echo and subsequent data values being all continuously 0, and $v_2$ is the position of the second 0 occurring in the column; $k_{m'}$ in $(k_{m'},v_{m'})$ means finding the column name with high echo and subsequent data values being all continuously 0, and $v_{m'}$ is the position of the $m'^{th}$ 0 occurring in the column.

In a two-level loop, the tuples in list List3 and list List1 are traversed. The tuples in the list List3 represent the starting column name and length; the tuples in the list List1 represent the column name and position. When the starting column name i in the list List3 is equal to the column name k in the list List1 (List3_i=List1_k), it is necessary to check whether there are multiple continuous zeros after this position. If so, the particular area is framed in red. This step is intended to continue the determination of the V-shaped notch for a certain continuous area found in the previous step, which all contain high echo values.

Whether the high echo values in the area are all followed by 0 is determined, that is, there is no echo value. If not, the area is identified as a V-shaped notch and framed in red. Meanwhile, the information of the area, namely the position of the V-shaped notch, is automatically output.

In this embodiment, the TBSS is identified as follows:

An empty List4 is created to store position information of the continuous segment of the high echo value. Let $t_1$ be the threshold of high echo, $t_1=12$. Let $t_2$ be the threshold of continuous segment, $t_2=3$.

For each column C in the dictionary and for each index i' in C, if C[i']≥$t_1$ (the threshold for high echo is set to 12), then i' is recorded as a position with a high echo value. If C[i'] and C[i'+1] are positions of continuous high echo values, then the i'$^{th}$ index and the i'+1$^{th}$ index are recorded as the starting and ending positions of a continuous segment. Otherwise, the index i' is skipped. The length l of each recorded continuous segment is calculated as the end position minus the start position plus one. If l≥t2 (at least three high echo values occur continuously to determine that this is a strong echo area, and TBSS may exist), then the position information of the continuous segment is stored as a tuple (c,s,e) in the list List4, where c represents the column name, s represents the starting position, and e represents the ending position. Otherwise, the continuous segment is skipped. The purpose of this step is to find the positions of all continuous segments of high echo values in D, which is the first step to find TBSS because TBSS occurs after high echoes.

Let the list List5 be an empty list for storing position information of TBSS. Let $t_3$ be the length threshold of TBSS, $t_3=8$. For each tuple (c,s,e) in the list List4, the values in C are checked starting from e, the position z where the first value is 0 is found, and then z-e are calculated, i.e., the length d from the high echo value to the first 0 value. If d≥t3 (the length range of the TBSS peak region is artificially set), then the tuple (c,e,z) is stored in the list List5. Otherwise, the tuple is skipped. This is done to obtain the number of pixels that are present after the high echo until no echo is present, i.e., the length of the area that passes through the high echo and then gradually decreases until no echo is present. This situation is the basis for determining whether TBSS exists in the area, because TBSS usually forms a peak area after the high echo.

Let R be a radar image whose elements are echo values. Let $t_4$ be the height threshold of TBSS. $t_4=5$. For each tuple (c,e,z) in the list List5, the position of TBSS is marked with a red box in R, with the coordinates of its upper left corner (c,e) and its lower right corner (c,h), where h is dynamically adjusted by finding the first position of the continuous 0 value greater than or equal to $t_4$ in the list List5. Meanwhile, the geographic information of the area, such as longitude, latitude and altitude, is calculated. This step aims to dynamically adjust the height of the box according to the actual situation to accurately identify the position of the TBSS.

The present disclosure achieves rapid and accurate automatic identification of V-shaped notches and TBSS in meteorological radar image by image spatial mapping processing technology, and accurately conveys the position to meteorological staff. This method has the advantages of simple structure, low calculation overhead, full automation and no requirement of human involvement, which greatly reduces the workload of staff. In addition, this method is also highly efficient, improves the accuracy of forecasts, and reduces errors caused by human subjective determination.

The present disclosure achieves the automatic identification of the V-shaped notch and the TBSS in the meteorological radar image, accurately positions the meteorological phenomena and timely coveys the identification result to meteorological staff. Compared with traditional methods, this method has the characteristics of simple structure and low computational overhead, achieves fully automated operation, and does not require human participation, thereby significantly reducing the workload of staff. Meanwhile, due to the high efficiency of the method, the accuracy and timeliness of monitoring and early warning of the strong meteorological disaster such as hail are successfully improved, and errors possibly introduced by artificial subjective determination are reduced. The automation characteristic of the method not only improves the working efficiency, but also reduces the dependence on the professional knowledge of operators. The innovative method is not only a technical progress, but also an important improvement in the field of meteorological monitoring and forecasting. By reducing manual intervention, the processing speed and accuracy of meteorological data are improved, so that the requirements of modern meteorological work on high efficiency, accuracy and automatic processing are better met, and the quality and efficiency of meteorological monitoring and forecasting are positively influenced.

What is claimed is:

1. An automatic hail identification method based on radar image spatial mapping, comprising the following steps:
   S1: obtaining a base reflectivity radar image, wherein the base reflectivity radar image comprises radar information parameters and a radar echo image;
   S2: identifying text information, digital parameters and color scales from the radar information parameters, grading radar echoes using intensity values represented by different colors, and detecting radar center coordinates from the radar echo image;
   S3: performing spatial mapping on radar echo information through a planar projection algorithm by using the radar center coordinates and the identified text information and digital parameters, and establishing a dictionary for radar echo intensity in a new radar image space;
   S4: after expanding the dictionary in a rectangular coordinate system of a screen, transforming V-shaped notch and three-body scatter spike (TBSS) characteristics behind an original radar echo area into a standard rectangle and a triangle behind a echo in the new radar image space;
   S5: establishing an identification for the standard rectangle and the triangle behind the echo in the new radar image space, filtering out noise interference, and analyzing the standard rectangle and the triangle outside of a echo by graphic fitting, wherein if the standard rectangle behind the echo in the new radar image space is successfully fitted, there is a V-shaped notch in the original radar image, and there is a second hail; if the triangle behind the echo in the new radar image space is successfully fitted, there is TBSS in the original radar image, and there is first hail; otherwise, there is no hail; and
   S6: marking the V-shaped notch or the TBSS if any in the original radar image, calculating a position where hail occurs using the identified text information and digital parameters, outputting an identification result as first hail or second hail, and the position where hail occurs, otherwise, outputting no hail.

2. The automatic hail identification method based on radar image spatial mapping according to claim 1, wherein the S2 comprises the following steps:
   S201: identifying text information and digital parameters in a text description from a description of the base reflectivity radar image and a radar information parameter area;
   S202: identifying parameters and color scales from the description of the base reflectivity radar image and a radar information parameter area, and grading radar echoes by intensity values represented by different colors; and
   S203: detecting radar center coordinates from the radar echo image according to a grading result, wherein the detection is performed at each angle in sequence from the radar center from inside to outside in a clockwise direction from due north until the detection of an entire radar echo image is completed.

3. The automatic hail identification method based on radar image spatial mapping according to claim 1, wherein the S3 comprises the following steps:
   S301: according to the radar center coordinates and the identified text information and digital parameters, storing radar echo intensity levels of points in an original radar echo image into a dictionary after radar echo information of points is subjected to spatial mapping according to a planar projection algorithm, wherein the points are all points in the original radar echo image;
   S302: determining whether an angle of a certain point from the radar center exists in a key of the dictionary, if so, storing coordinates and a radar echo intensity level of the point into the dictionary, and proceeding to S303, otherwise, establishing a key value pair in the dictionary to store the coordinates and the radar echo intensity level of the point, and proceeding to S303; wherein the point is a currently processed point in the original radar echo image; and
   S303: establishing a dictionary for radar echo intensity in a new radar image space after the spatial mapping is completed.

4. The automatic hail identification method based on radar image spatial mapping according to claim 3, wherein the spatial mapping is specifically as follows:
   in the original radar echo image, a position of each point is represented by screen coordinates (x,y) and is subjected to spatial mapping by using the following formula:

$$\theta = tg^{-1} \frac{x - x_0}{y - y_0}$$
$$r = \sqrt{(x - x_0)^2 + (y - y_0)^2}$$

wherein ($\theta$,r) represents polar coordinates of each point of the radar echo, $\theta$ represents an angle, r represents a distance to a center of a circle, $x_0$ represents an abscissa of a radar station, $y_0$ represents an ordinate of a radar station, $x_0$ and $y_0$ together represent a position of an origin in the original radar echo image, tg represents a tangent function in a trigonometric function, $tg^{-1}$ represents an inverse function of the tangent function, and (x,y) represents screen coordinates.

5. The automatic hail identification method based on radar image spatial mapping according to claim 3, wherein the S5 comprises the following steps:
S501: filtering out noise interference of the new radar image;
S502: setting a radar echo intensity level greater than or equal to 12 as a hail target;
S503: analyzing a position behind the hail target by graphic fitting on outside of a echo in a new radar image space after spatial projection according to the conditions set in the S502; and
S504: determining whether there is a V-shaped notch and TBSS in the radar echo area according to a result of the graphic fitting analysis and whether there is a standard rectangle or a triangle behind the echo, wherein if the standard rectangle behind the echo in the new radar image space is successfully fitted, there is a V-shaped notch in the original radar echo image, and there is the second hail; if the triangle behind the echo in the new radar image space is successfully fitted, there is TBSS in the original radar echo image, and there is first hail; otherwise, there is no hail, and the process ends.

6. The automatic hail identification method based on radar image spatial mapping according to claim 5, wherein the determining whether there is a V-shaped notch in the radar echo area is specifically as follows:
A1: creating an empty list List1 for storing V-shaped notch position information;
A2: taking the transformed dictionary as a matrix M, wherein $M_{i,j}$ represents an element in an $i^{th}$ row and $j^{th}$ column:

$$\text{max\_positions}(j) = \max_i (M_{i,j})$$

wherein max represents a maximum value, max_positions (j) represents a position where the maximum value occurs, and $$\max_i (M_{i,j})$$

represents a result of taking maximum values of all elements in the $i^{th}$ row;
A3: if there is a same maximum value in the same column, determining a position where the maximum value occurs last:

last_max_positions(j)=max_positions(j)$_{lastoccurrence}$ wherein last_max_positions(j) represents a position where the maximum value occurs last, and max_positions(j)$_{lastoccurrence}$ represents finding a position where a last maximum value occurs in the same column;
A4: determining whether the maximum value is at the end of a current column by the following formula, if so, proceeding to A6; otherwise, proceeding to A5:

$$\text{max\_at\_end}(j) = \begin{cases} 1 & \text{If: last\_max\_positions}(j) = \text{rows} - 1 \\ 0 & \text{Otherwise} \end{cases}$$

wherein max_at_end(j) represents that the maximum value is at the end of the current column, and rows represents a row number of a current position;

A5: determining whether the maximum value is at the end of the current column by the following formula, and proceeding to A6:

$$\text{max\_at\_end}(j) = \begin{cases} 1 & \text{If max\_value}(j) \geq 12 \\ 0 & \text{Otherwise} \end{cases}$$

wherein max_value(j) represents the maximum echo threshold;
A6: adding the determined maximum value and the position thereof to the List1;
A7: creating an empty list List2 and an empty list List3 separately, wherein List2 is used to store column names extracted from the list List1; the list List3 is used to store continuous areas that all contain echo values;
A8: traversing each element in the list List1, obtaining a continuous segment, and recording a start index and an end index of the continuous segment, wherein when the continuous segment is traversed, a length of the segment is calculated, and the continuous segment is a continuous column name;
A9: determining whether the length of the segment is greater than a preset threshold, if so, storing an initial column name and the length as a tuple in the list List3, and proceeding to A10, otherwise, returning to A8;
A10: traversing tuples in the list List3 and the list List1, determining whether the initial column name i" in the list List3 is equal to a column name k in the list List1, if so, proceeding to A11, and otherwise, repeating A10; wherein the tuple in the list List1 represents a column name and a position, and the tuple in the list List3 represents an initial column name and a length;
A11: determining whether there are a plurality of continuous zeros after the position according to a determination result, if so, marking an area and proceeding to A12, otherwise, returning to A10; and
A12: when values following the echo in the marked area are all 0, marking the area as a V-shaped notch, and outputting position information of the V-shaped notch to complete the determination of whether there is the V-shaped notch in the radar echo area.

7. The automatic hail identification method based on radar image spatial mapping according to claim 5, wherein the determining whether there is TBSS in the radar echo area is specifically as follows:
B1: creating an empty list List4, letting $t_1$ be a echo value threshold, let $t_2$ be a continuous segment threshold, wherein the continuous segment is a continuous column name; the list List4 is used to store position information of the continuous segment of the echo value;
B2: for each index of each column C in the dictionary, if a echo value of an $i'^{th}$ index C[i'] in the column C is greater than or equal to the echo value threshold $t_1$, recording the $i'^{th}$ index as a echo value position; if the $i'^{th}$ index and an $i'+1^{th}$ index are continuous echo value positions, recording the $i'^{th}$ index and the $i'+1^{th}$ index as a starting position and an ending position of the continuous segment;
B3: calculating a length of each recorded continuous segment, and if the calculated length is greater than or equal to the continuous segment threshold $t_2$, storing the position information of the continuous segment as a tuple (c,s,e) in the list List4, wherein c represents the column name, s represents the starting position, and e represents the ending position;

B4: creating a list List5, and letting $t_3$ be a length threshold of TBSS, wherein the list List5 is used to store the position information of the TBSS;

B5: for each tuple (c,s,e), checking values in each column C starting from the starting position e, and obtaining a position z where a first value is 0;

B6: calculating a difference d between the position z and the starting position e, that is, a length d from the echo value to the first value 0;

B7: if the length d is greater than or equal to the length threshold $t_3$ of the TBSS, storing the tuple (c,s,e) into the list List5;

B8: letting R be a radar image whose elements are echo values and letting $t_4$ be a height threshold of the TBSS; and B9: for each tuple (c,s,e) in the List5, marking a position of the TBSS in the radar image R, and completing the determination of the TBSS by the radar echo area.

* * * * *